(12) United States Patent
Yoshii et al.

(10) Patent No.: US 6,457,217 B2
(45) Date of Patent: Oct. 1, 2002

(54) COMPONENT ATTACHING DEVICE

(75) Inventors: Hiroyuki Yoshii; Tomoharu Izume, both of Toyonaka (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/849,536

(22) Filed: May 7, 2001

(30) Foreign Application Priority Data

May 18, 2000 (JP) ........................................ 2000-146979

(51) Int. Cl.[7] .................................................. F16B 5/00
(52) U.S. Cl. ........................ 24/297; 24/581.11; 24/453; 24/704.2; 24/DIG. 32; 411/104; 411/508
(58) Field of Search ................................ 411/508, 913, 411/104, 509, 510, 512, 581.11; 24/297, 115 F, 453, 602, 704.1, 704.2, DIG. 32, DIG. 35; 174/138 D; 403/2, 408.1; 292/307 A, 307 R

(56) References Cited

U.S. PATENT DOCUMENTS 4,720,204 A * 1/1988 Johnson
4,742,605 A * 5/1988 Ritacco
4,782,564 A * 11/1988 Sloan
5,466,082 A * 11/1995 Sherar

FOREIGN PATENT DOCUMENTS

| EP | 0 685 657 | 12/1995 |
| GB | 1 543 321 | 4/1979 |
| GB | 2 037 874 | 7/1980 |
| GB | 1 598 285 | 9/1981 |

* cited by examiner

*Primary Examiner*—James R. Brittain
(74) *Attorney, Agent, or Firm*—Kanesaka & Takeuchi

(57) ABSTRACT

A component attaching device for attaching a component to an attaching member is formed of a first attaching section to be attached to the attaching member, and a second attaching section connected to the first attaching section to be attached to the component. A releasing section is formed near the first or second attaching section for releasing an attached condition of the attaching member with the first attaching section or an attached condition of the component with the second attaching section. The attached conditions is released when a force of relatively moving the attaching member and the component exceeds a predetermined value. Also, a holding section is formed near the releasing section such that the attaching member and the component are relatively moved.

6 Claims, 7 Drawing Sheets

COMPONENT ATTACHING DEVICE

BACKGROUND OF THE INVENTION AND RELATED ART STATEMENT

The present invention relates to a component attaching device for attaching a component to be attached to an attaching member.

As an example of a conventional component attaching device, FIG. 7 shows an equipment component engaging member 310 for attaching an equipment or equipment component 322 to a body side panel 320.

The equipment component engaging member 310 is formed of a base plate 312, and an engaging section 314 projecting from a center of the base plate 312. When the base plate 312 is inserted into a box-like holder 324 of the equipment component 322, a projecting portion 316 on the base plate 312 is engaged with a round hole.

The engaging section 314 is formed in an anchor shape by an elastic material. When the engaging section 314 is inserted into the body side panel 320, a stepped portion 318 of an end portion of an engaging piece is engaged with the body side panel 320. Accordingly, the equipment component 322 is attached to the body side panel 320, and they are relatively fixed at certain positions.

Generally, in an attachment condition that the component is attached to the attaching member, in case a force for relatively moving the attaching member and the component is applied, it may be desired to allow a relative movement within a certain range.

However, in the equipment component engaging member 310 shown in FIG. 7, for example, even if a force for relative movement is applied to the body side panel 320 and the equipment component 322, the relative movement is not allowed unless the equipment component engaging member 310 is torn or broken. Also, once the equipment component engaging member 310 is broken to allow the relative movement, since the body side panel 320 and the equipment component 322 become a free condition, the relative movement is allowed without limits.

Not only the equipment component engaging member 310 shown in FIG. 7 but also a conventional general component attachment member were not able to allow the relative movement within the certain range in case the force for relatively moving the attaching member and the component to be attached were applied.

The present invention has been made in view of the foregoing, and an object of the invention is to provide a component attaching device, in which a component to be attached can be securely fixed and attached to an attaching member without wobbling, and in case a force for a relative movement acts on the component to be attached and the attaching member, the relative movement thereof is allowed within the certain range.

Further objects and advantages of the invention will be apparent from the following description of the invention.

SUMMARY OF THE INVENTION

To achieve the aforementioned objects, a first aspect of the present invention provides a component attaching device for attaching a component to be attached to an attaching member, which is formed of a first attaching section to be attached to the attaching member; a second attaching section to be attached to the component to be attached; a releasing section for releasing at least one of an attached condition of the attaching member with the first attaching section and an attached condition of the component to be attached with the second attaching section when a force of relatively moving the attaching member and the component exceeds a predetermined value; and a holding section capable of holding the attaching member and the component at predetermined positions in which the main body and the component are relatively moved.

Namely, in the component attaching device of the invention, the first attaching section is attached to the attaching member and the second attaching section is attached to the component to be attached, so that the component can be attached to the attaching member by the component attaching device without wobbling.

When the force for relatively moving the attaching member and the component acts on these members and this force exceeds the predetermined value, the releasing section releases at least one of the attached condition of the attaching member with the first attaching section and the attached condition of the component with the second attaching section. Accordingly, the attaching member and the component become relatively movable, so that the attaching member or the component moves in the direction of the force which acts thereon.

Since the holding section is provided in the component attaching device, the attaching member and the component are held at the predetermined position to which they are relatively moved. Therefore, the relative movement of the attachment member and the component is limited within the predetermined range by the holding section.

As described above, in the component attaching device according to the first aspect of the invention, in case the force for relatively moving the attaching member and the component works thereon, the relative movement can be allowed within the certain range.

According to a second aspect of the invention, the component attaching device in the first aspect of the invention further includes a rigid member provided with one of the first attaching section and the second attaching section, and an engaging member provided with the other of the first attaching section and the second attaching section, wherein the engaging member is engaged with the rigid member.

As described above, by forming the component attaching device of the invention by two members, that is, the rigid member and the engaging member, the shapes and the strengths can be relatively freely selected. For example, by forming the rigid member by a material having a high rigidity, the attachment condition of the component to the attaching member can be definitely maintained. Also, by forming the engaging member by a material having a rigidity lower than that of the rigid member, it can be structured that the releasing section having the rigidity lower than that of the rigid member is formed at the engaging member as in a third aspect of the invention. By deforming or tearing the releasing section, it is possible to release at least one of the attached condition of the attaching member with the first attaching section and the attached condition of the component with the second attaching section.

According to a fourth aspect of the invention, in the component attaching device of the third aspect of the invention, the rigid member is formed of a rigid pin having a predetermined rigidity, and the rigid pin is disposed to conincide with a direction of the relative movement.

Therefore, the relative movement of the attaching member and the component can be guided by the rigid pin, so that the relative movement can be carried out smoothly.

According to a fifth aspect of the invention, in the component attaching device of the fourth aspect of the invention, the engaging member has a guide slit, which is formed to correspond to a longitudinal direction of the rigid pin and guides the rigid pin into an engaging section when the rigid pin is placed and pushed against the guide slit.

Thus, by merely placing the rigid pin against the guide slit and pushing the same, the rigid pin can be engaged with the engaging section. In other words, the engaging member can be easily engaged with the rigid pin or rigid member.

DETAILED DESCRIPTION OF PREFERRED EMBODIMENTS

Figure 1:
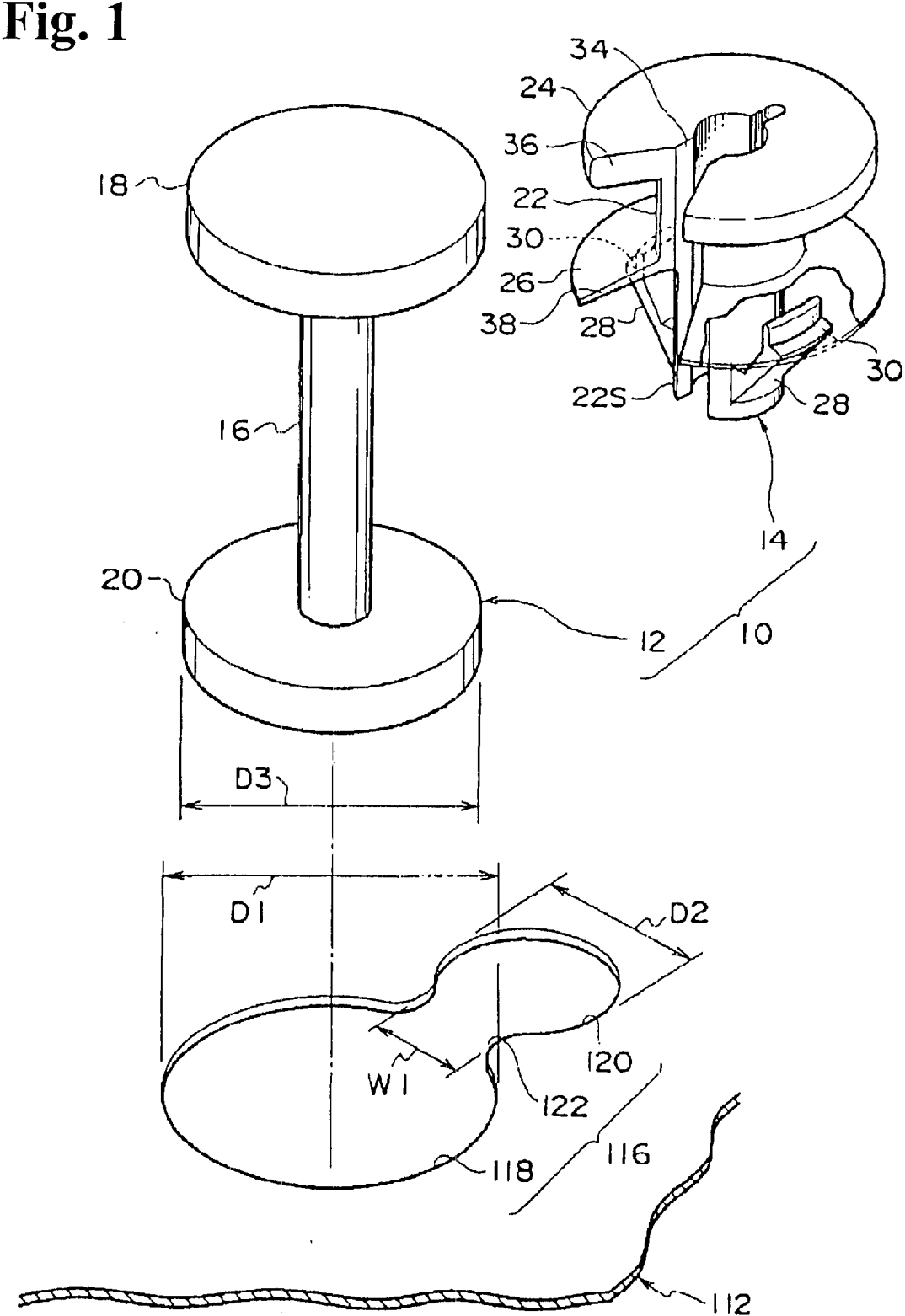
FIG. 1 is an exploded perspective view of a component attaching device of an embodiment of the invention.

Hereinafter, embodiments of the invention will be explained with reference to the attached drawings. FIG. 1 through FIG. 6 show a component attaching device 10 of an embodiment of the invention. In the embodiment of the invention, as an example of the component attaching device 10, there is shown a case in which a garnish 114 (an entire garnish is omitted in the figures) is attached to a body panel 112 forming a body of an automobile. As shown in FIG. 1, in the body panel 112, there is formed a mounting hole 116, in which a large-diameter hole portion 118 having a diameter D1 and a small-diameter hole portion 120 having a diameter D2 are communicated with each other by a communicating portion 122 having a width W1 smaller than the diameter D2 of the small-diameter hole portion 120. Thus, the mounting hole 116 has a shape of numeral eight as a whole. The garnish 114 is attached to the body panel 112 by using the mounting hole 116.

The component attachment member 10 is formed of a mounting pin 12 made of metal, and a clip 14 which is made of a resin and engages the mounting pin 12 to be fitted therewith. The mounting pin 12 includes a rod portion 16 in a cylinder shape, and flange portions 18 and 20 in circular disc shapes which are formed at both ends of the rod portion 16. The rod portion 16 has a diameter smaller than the width W1 of the communicating portion 122 of the mounting hole 116, and the clip 14 is fitted with the rod portion 16.

As shown in FIG. 3 through FIG. 6, the flange portion 18 at one end of the rod portion 16 is subjected to insert molding to be fixed to the garnish 114, and accordingly, the mounting pin 12 projects from the garnish 114.

On the other hand, as understood from FIG. 1, the flange portion 20 at the other end of the rod portion 16 is formed to have a diameter D3, which is smaller than that of the large-diameter hole portion 118 and larger than that of the small-diameter hole portion 120. Accordingly, the flange portion 20 can be inserted into the large-diameter hole portion 118, and in the condition that the flange portion 20 is moved to the side of the small-diameter hole portion 120, the flange portion 20 is engaged with the body panel 112, so that the mounting pin 12 is prevented from being disengaged inadvertently. Incidentally, in this embodiment, the flange portion 18 has the same diameter as that of the flange portion 20, and the mounting pin 12 can be used without considering the orientation. Needless to say, by considering a relationship between the garnish 114 and the large-diameter hole portion 118, the flange portion 18 and the flange portion 20 may have different diameters.

The clip 14 includes a base portion 22 formed in a substantially cylindrical shape. The base portion 22 is formed such that one side (lower side in FIGS. 3 to 6) from about a center in the axial direction has a diameter smaller than that at the other side. A small-diameter portion 22S is formed to have a diameter D4 smaller than the width W1 of the communicating portion 122 of the mounting hole 116 in the condition that the clip 14 is attached to the rod portion 16. Therefore, in the condition that the flange portion 20 of the mounting pin 12 is inserted into the large-diameter hole portion 118 and the small-diameter portion 22S is located in the body panel 112, the component attaching device 10 is moved to the small-diameter hole portion 120 through the communicating portion 122 without resistance, resulting in the condition shown in FIG. 2 through FIG. 4.

At the one end of the base portion 22, there is formed a flange portion 24 having a diameter larger than that of the base portion 22, and the garnish 14 is sandwiched or cramped between the flange portion 24 and the flange portion 18 of the rod portion 16 as shown in FIG. 3 through FIG. 6.

At a center of a longitudinal direction of the base portion 22, there is formed a cramping portion 26 in a flattened conical shape. The cramping portion 26 has a diameter D5 larger than that of the small-diameter hole portion 120 of the mounting hole 116, and the body panel 112 can be cramped or sandwiched between the cramping portion 26 and legs 28 described later.

Figure 4:
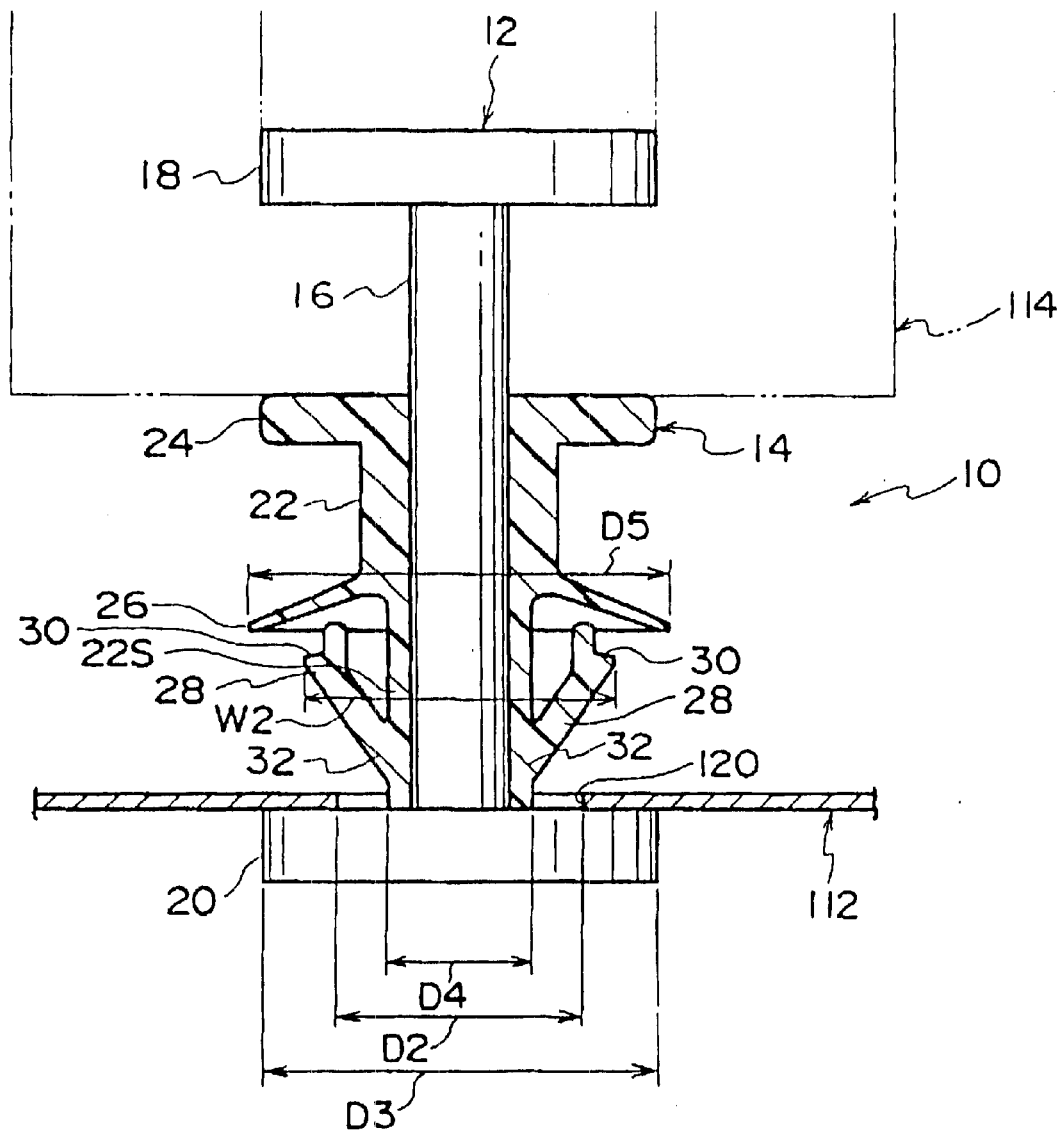
FIG. 4 is a sectional view of the component attaching device in the condition that the component attaching device is temporarily attached to the body panel.

From a vicinity of the end of the longitudinal direction of the base portion 22, a pair of legs 28 projects obliquely toward the cramp portion 26. As understood from FIG. 4, the shapes of the legs 28 are determined such that a width W2 between the two legs 28 is larger than the diameter D2 of the small-diameter hole portion 120 of the mounting hole 116. As shown in FIG. 4, under the condition that the component attaching device 10 is positioned at the small-diameter hole portion 120 of the mounting hole 116, when the component attaching device 10 is moved in a direction such that the legs 28 get close to the body panel 112, the legs 28 are pressed by a hole rim of the small-diameter hole portion 120 to be elastically deformed inwardly, so that the legs 28 can pass through the small-diameter hole portion 120.

Figure 5:
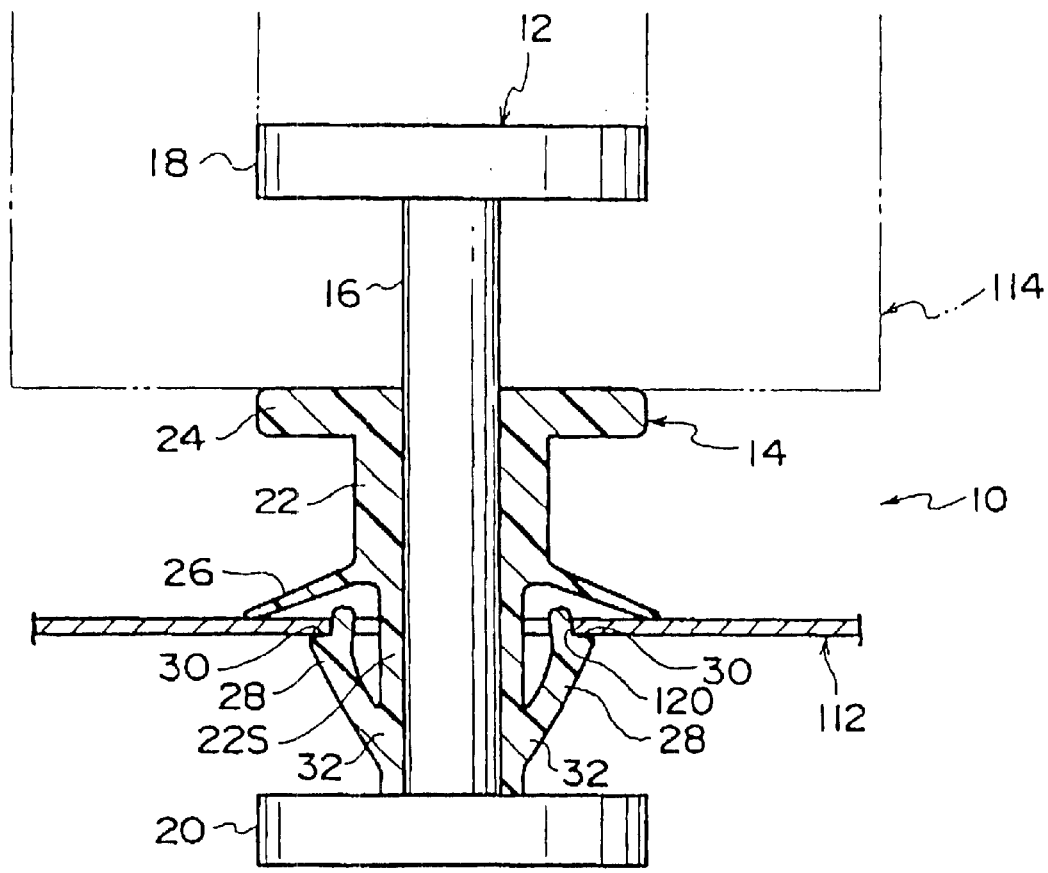
FIG. 5 is a sectional view of the component attaching device in an attached condition.

At the distal ends of the legs 28, engaging step portions 30 are formed. As shown in FIG. 5, when the body panel 112 is located at the engaging step portions 30, the legs 28 are expanded outwardly by an elastic reaction, and also, the engaging step portions 30 engage a rear surface (lower surface in FIG. 3 through FIG. 6) of the body panel 112, so that the body panel 112 does not move to the side of the flange portion 20 inadvertently. Also, at this time, the legs 28 expand outwardly by the elastic reaction, and the legs 28 contact the small-diameter hole portion 120 closely from an inner side thereof elastically.

Base end portions of the legs 28 near the base portion 22 constitute tearing portions 32, which are torn when a force larger than a predetermined value acts on the legs 28 in a direction toward the flange portion 18.

Figure 2:
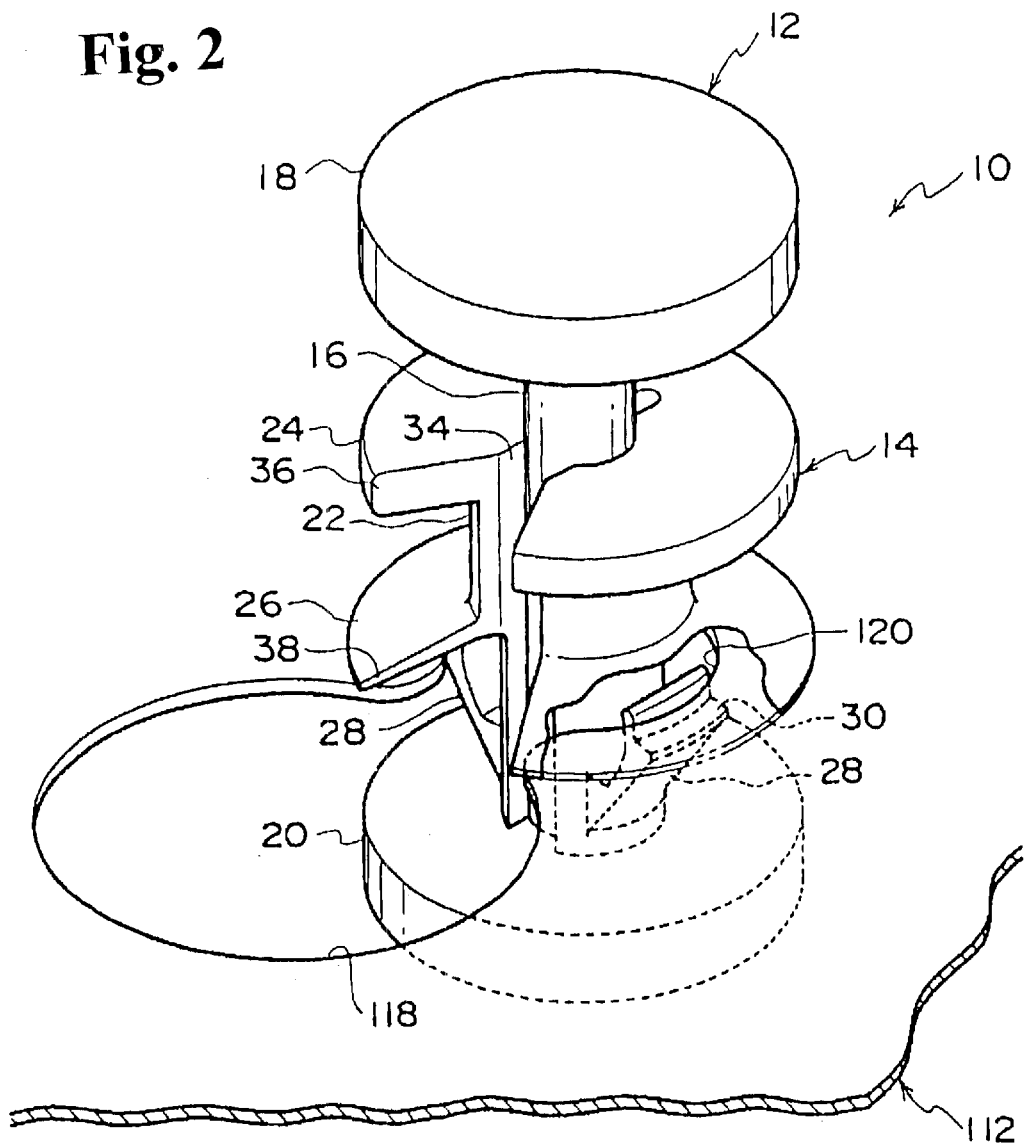
FIG. 2 is a perspective view of the component attaching device of the embodiment of the invention.

As shown in FIG. 1 and FIG. 2, in the base portion 22 of the clip 14, there is formed a guide slit 34 having a width smaller than the diameter of the rod portion 16 of the mounting pin 12 throughout the axial direction. Also, in the flange portion 24 and the cramping portion 26, notches 36 and 38 are respectively formed at positions corresponding to the guide slit 34. As understood from FIG. 1, the notches 36 and 38 are formed in sector forms expanding from a center toward an outside in the radial direction when the clip is seen in the axial direction. By placing the rod portion 16 against the notches 36 and 38, and pushing the rod portion 16 toward the center of the base portion 22, the rod portion 16 pushes the guide slit 34 to expand the same, so that the rod portion 16 enters the base portion 22. Accordingly, the clip 14 can be easily attached to the mounting pin 12. Once the rod portion 16 enters the base portion 22, the base portion 22 cramps the rod portion 16 from the outside by the elastic reaction, and the base portion 22 closely contacts the rod portion 16. Also, since the guide slit 34 has the width smaller than the diameter of the rod portion 16, the rod portion 16 is not disengaged inadvertently. Accordingly, the clip 14 is attached to the mounting pin 12 to constitute the component attaching device 10 of the embodiment.

In the small-diameter portion 22S of the base portion 22, a projection strip 40 is formed on a side opposite to the guide slit 34, and a distance L from a center of the mounting pin 12 to a projection end 40T of the projection strip 40 is a half of the diameter D2 of the small-diameter hole portion 120. Also, in the projection strip 40, there is formed a tapered surface 42 which gradually extends away from the center of the mounting pin 12 as the distance from the flange portion 20 toward the flange portion 18 increases. Under the condition that the small diameter portion 22S is located in the body panel 112 (refer to FIG. 4), even if the center of the rod portion 16, i.e. the component attaching device 10, and the center of the small-diameter hole portion 120 are not aligned, when the component attaching device 10 moves in the direction that the legs 28 come closer to the body panel 112, the tapered surface 42 contacts the hole rim of the small-diameter hole portion 120, so that the component attaching device 10 also moves in the radial direction. Thus, in the attached condition (refer to FIG. 5), the center of the component attaching device 10 coincides with the center of the small-diameter hole portion 120.

Next, there will be explained a method of attaching the garnish 114, i.e. component to be attached, to the body panel 112, i.e. attaching member main body, by using the component attaching device 10 of the embodiment, and operations of the component attaching device 10.

Under the condition that the flange portion 18 at one end of the mounting pin 12 is fixed to the garnish 114, the flange portion 20 at the other end of the mounting pin 12 is inserted into the large-diameter hole portion 118 of the mounting hole 116. Then, in the condition that the body panel 112 is positioned near root portions of the legs 28, the component attaching device 10 is moved toward the small-diameter hole portion 120. At this time, since the diameter D4 of the small-diameter portion 22S of the clip 14 is smaller than the width W1 of the communicating portion 122, the component attaching device 10 can be moved without resistance.

Figure 3:
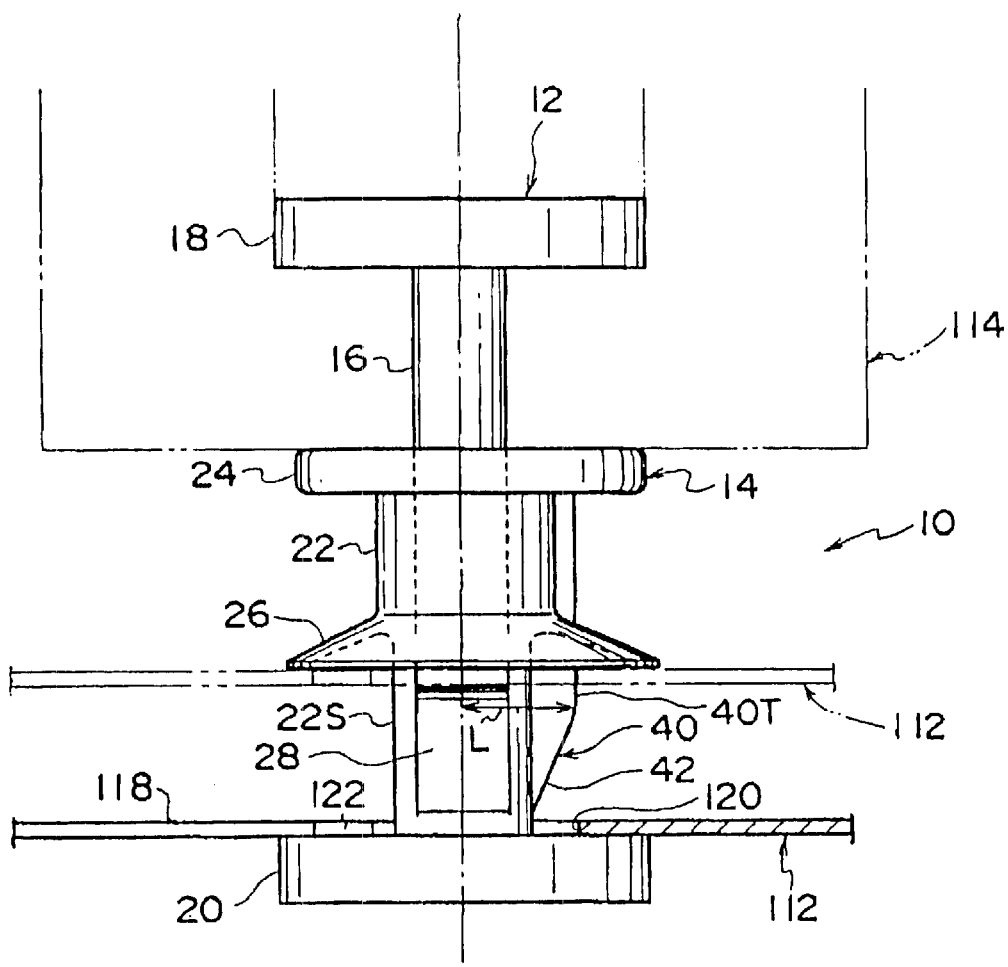
FIG. 3 is a side view of the component attaching device in a condition that the component attaching device is temporarily attached to a body panel.

As shown in FIG. 2 through FIG. 4, when the component attaching device 10 reaches the small-diameter hole portion 120, the relative movement of the body panel 112 relative to the component attaching device 10 in the axial direction is limited within a certain range since the body panel 112 abuts or hits against the flange 20 or the legs 28. This results in the condition that the garnish 114 is temporarily attached to the body panel 112 through the component attaching device 10. Since there is formed a larger space between the garnish 114 and the body panel 112 in the temporarily attached condition as compared with that in the attachment condition described later, for example, an operation for wiring or the like into the above space can be facilitated, to thereby improve the working ability.

Next, the garnish 114, i.e. component attaching device 10, is pushed into the body panel 112. At this moment, since the legs 28 abut against the body panel 112, there is caused a resistance against the above pushing. However, since the legs 28 are elastically deformed, the garnish 114 can be further pushed in. Then, in the condition that the cramping portion 26 abuts against the body panel 112 and is slightly deformed elastically toward the side of the flange portion 24, the engaging step portions 30 of the legs 30 reach the position of the body panel 112. Here, as shown in FIG. 5, the legs 28 are elastically returned to contact the small-diameter hole portion 120 closely from the inner side, and at the same time, the body panel 112 is sandwiched between the legs 28 and the cramp portion 26. Accordingly, the garnish 114 is attached to the body panel 112 without wobbling in the attached condition.

In the attached condition, the garnish 114 and the body panel 112 are strongly fixed to each other, and even if the force for separating the garnish 114 from the body panel 112 acts on the garnish 114, as long as this force is within the certain range, which does not break the torn portions 32 of the legs 28, the relative position does not change inadvertently.

Figure 6:
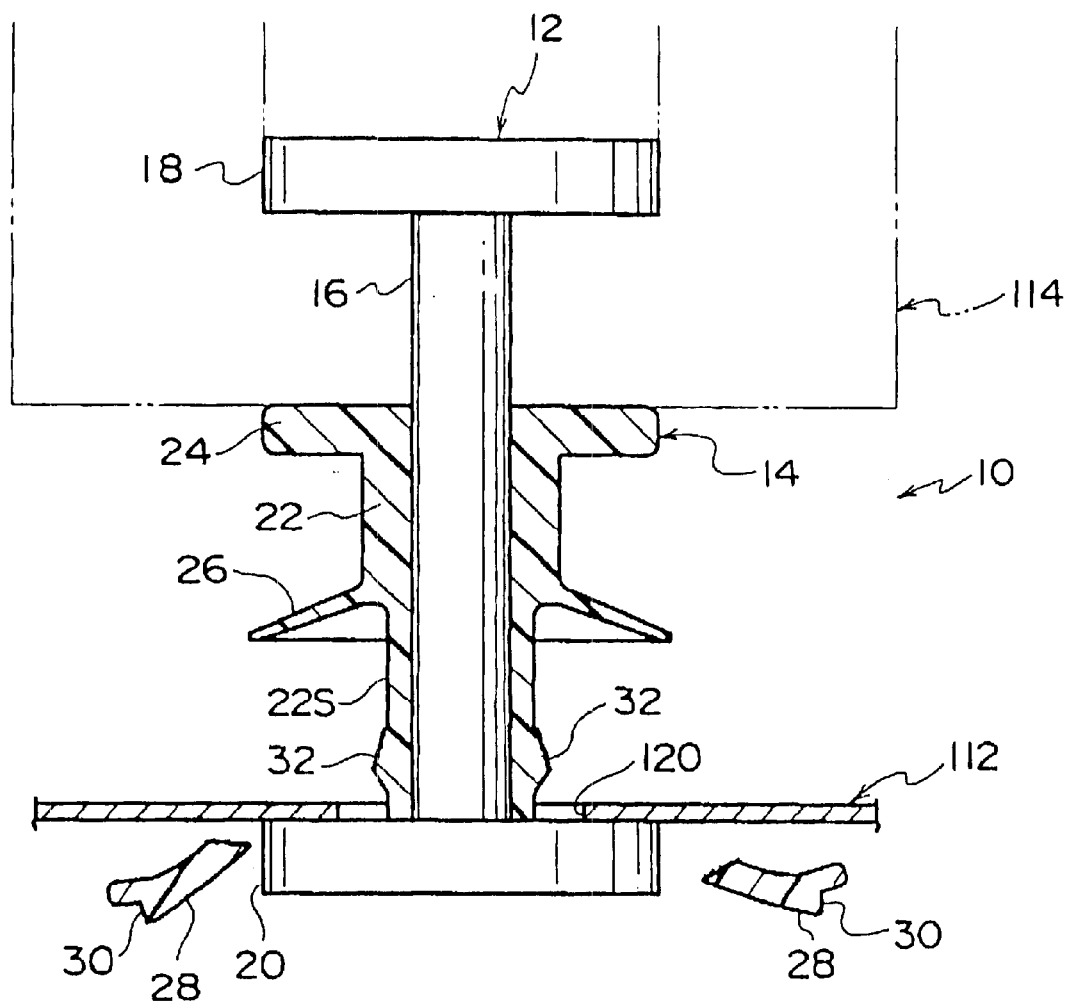
FIG. 6 is a sectional view of the component attaching device in a condition that leg portions are broken.
Figure 7:
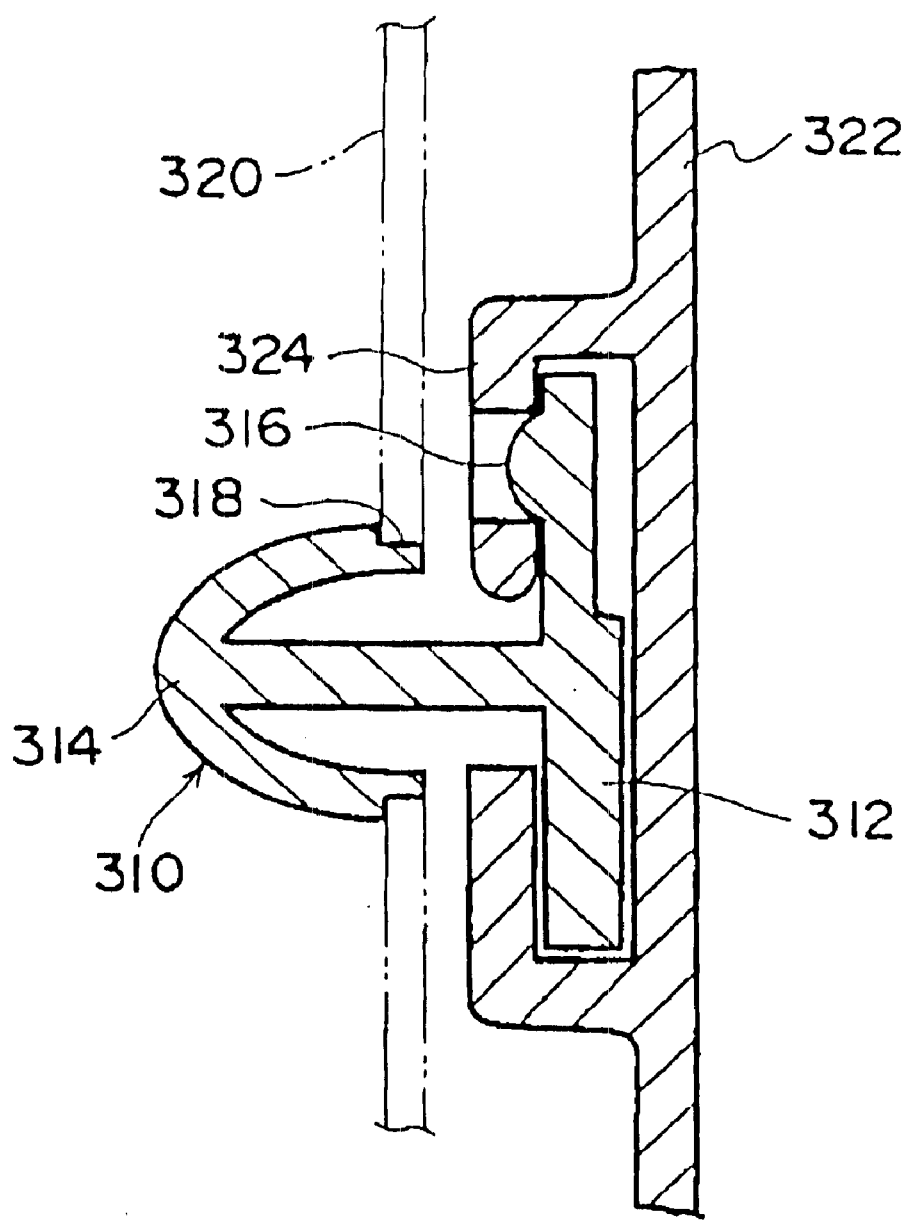
FIG. 7 is a sectional view of a conventional equipment component engaging member in an attached condition.

When this force exceeds the certain range, the force acts on the legs 28 through the body panel 112, so that the legs 28 are torn at the torn portions 32 as shown in FIG. 6. Accordingly, the body panel 112 is not sandwiched between the legs 28 and the cramp portion 26, and the attachment condition is released, so that the garnish 114 is moved in a direction of being separated from the body panel 112. This movement is limited within the certain range since the flange portion 20 of the mounting pin 12 abuts against the body panel 112. Therefore, the mounting pin 12 is not entirely separated from the body panel 112, nor the garnish 114 is separated from the body panel 112 more than it should be.

Furthermore, when the garnish 114 moves with respect to the body panel 112, in the embodiment of the invention, the moving direction thereof coincides with the axial direction of the mounting pin 12. As a result, the relative movement is guided by the rod portion 16 of the mounting pin 12, and shift or displacement of the position does not occur inadvertently, so that the garnish 114 can move smoothly.

As explained above, in the component attaching device 10 of the invention, the garnish 114 can be surely fixed to the body panel 112, and furthermore, when the force in the direction of moving these members closer to each other acts on them, the attachment condition is released to allow the movement thereof while the movement can be limited within the certain range.

Incidentally, in the above explanation, it is exemplified that the clip 14 cramps the body panel 112, but there can be a structure that the garnish 114 is cramped by the clip 14. Namely, the flange portion 18 of the mounting pin 12 is fixed to the body panel 112. In fact, the relationship between the attaching member and the component to be attached is relative, and either of them can be attached to the clip 14.

Also, the direction of the relative movement is not limited to the direction in which the attaching member and the component are separated from each other, and for example, the direction of the relative movement can be a direction in which these members come closer to each other. In this case, by setting the positions of the legs 28 at appropriate positions such that the force for relative movement works, the force for moving relatively can definitely act on the legs 28.

In regard to the releasing section in which the attachment condition with respect to either the attaching member or the component is released to allow the relative movement, the structure is not limited to the above torn portions 32. For instance, the releasing section can be a deforming section which is deformed without being torn to release the attachment condition. In either of the structures, the component attaching device is not necessarily formed of a plurality of members, i.e. mounting pin 12 and clip 14, and can be formed of a single member. As in the aforementioned embodiment, the component attaching device can be formed of two members having the different rigidity, so that the strengths or shapes required at the respective portions of the component attaching device can be freely selected.

Also, the attachment device and the component, to which the component attaching device 10 of the invention is applied, are not limited to the body panel 112 and the garnish 114. For example, in case of a side airbag device disposed in a pillar of an automobile, since it is often structured that the garnish 114 is separated from the body panel 112 within a certain range at the time of deploying the airbag, the component attaching device 10 of the invention can be suitably applied thereto. In this case, it is not necessary to apply the component attaching device 10 of the embodiment to all attaching portions, and at a portion in which the garnish 114 is not necessary to move relatively with respect to the body panel 112, an attaching member or device which has been used conventionally, e,g, a trim clip or the like, can be used. Alternatively, the component attaching devices of the invention can be applied to all of the attaching portions.

Since the present invention has the aforementioned structure, the component can be securely attached to the attaching member without wobbling, and also, the relative movement of these members is allowed within the certain range in case the force of relatively moving these members is applied.

While the invention has been explained with reference to the specific embodiments of the invention, the explanation is illustrative and the invention is limited only by the appended claims.

What is claimed is:

1. A component attaching device for attaching a component to an attaching member, comprising:
   a first attaching section adapted to be attached to the attaching member,
   a second attaching section connected to the first attaching section adapted to be attached to the component,
   a releasing section formed near at least one of the first and second attaching sections for releasing at least one of an attached condition of the attaching member with the first attaching section and an attached condition of the component with the second attaching section, said at least one of the attached conditions being released when a force of relatively moving the attaching member and the component exceeds a predetermined value,
   a holding section formed near the releasing section for holding the attaching member and the component at predetermined positions such that the attaching member and the component are relatively moved,
   a rigid member having one of the first attaching section and the second attaching section, and being formed of a rigid pin having a predetermined rigidity, said rigid pin being arranged to coincide with a direction of relatively moving the attaching member and the component, and
   an engaging member engaging the rigid member and having the other of the first attaching section and the second attaching section, said releasing section being formed in the engaging member.

2. A component attaching device according to claim 1, wherein said engaging member has a guide slit formed along a longitudinal direction of the rigid pin so that the engaging member is removably attached to the rigid pin through the guide slit.

3. A component attaching device for attaching a component to an attaching member, comprising:
   a first attaching section adapted to be attached to the attaching member,
   a second attaching section connected to the first attaching section adapted to be attached to the component,
   a releasing section formed near at least one of the first and second attaching sections for releasing at least one of an attached condition of the attaching member with the first attaching section and an attached condition of the component with the second attaching section, said at least one of the attached conditions being released when a force of relatively moving the attaching member and the component exceeds a predetermined value,
   a holding section formed near the releasing section for holding the attaching member and the component at predetermined positions such that the attaching member and the component are relatively moved,
   a rigid member having one of the first attaching section and the second attaching section, and having the holding section at one end thereof, said releasing section being located between the holding section and said one of the first attaching section and the second attaching section formed on the rigid member, and
   an engaging member engaging the rigid member and having the other of the first attaching section and the second attaching section.

4. A component attaching device according to claim 3, wherein said engaging member includes the releasing section, a cramping portion and at least two elastic legs extending toward the cramping portion to allow the attaching member to be sandwiched between the cramping portion and the legs.

5. A component attaching device according to claim 4, wherein said at least two legs are located between the cramping portion and the holding section so that when the at least two legs are torn, the attaching member is located between the cramping portion and the holding section.

6. A component attaching device according to claim 5, wherein said engaging member further includes a flange at a side opposite to the at least two legs relative to the cramping portion to allow the flange to abut against the component.

* * * * *